Dec. 26, 1961  R. A. HEISING  3,014,605
DISCHARGE CONTROL FOR HARVESTER
Filed Aug. 11, 1958  2 Sheets-Sheet 1
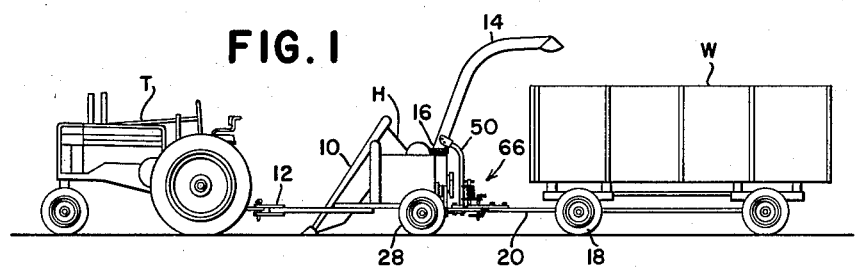
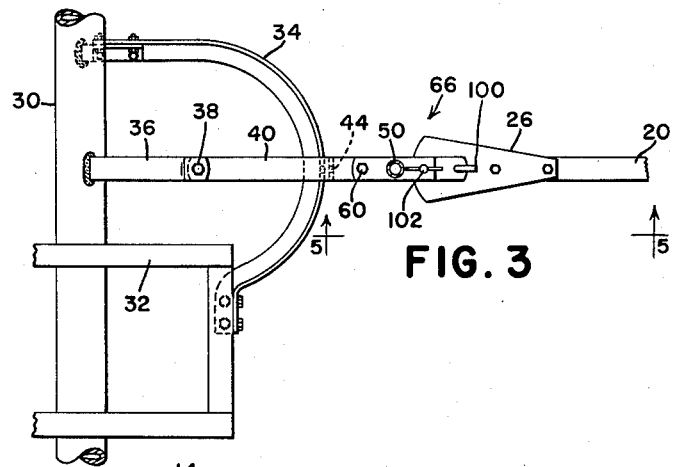
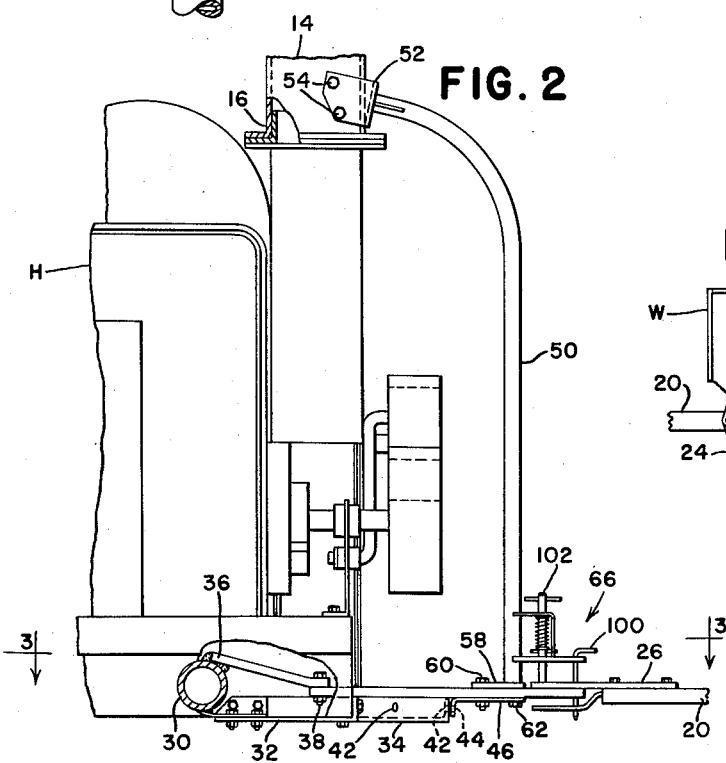
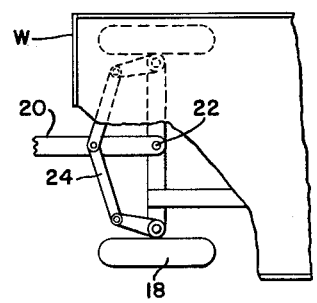
*INVENTOR.*
R. A. HEISING

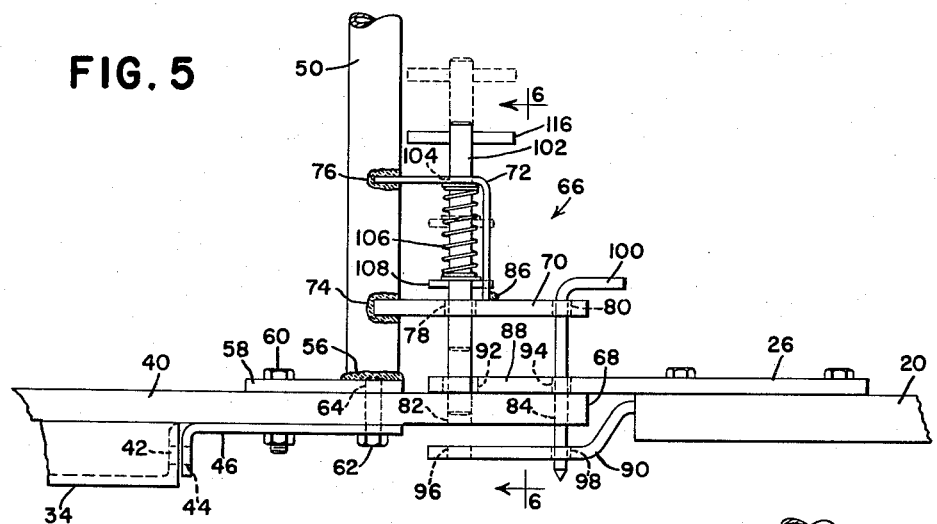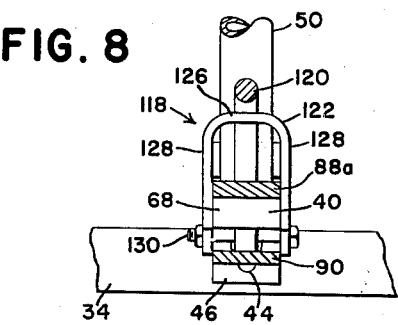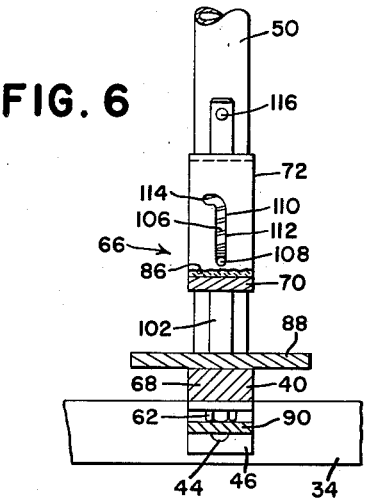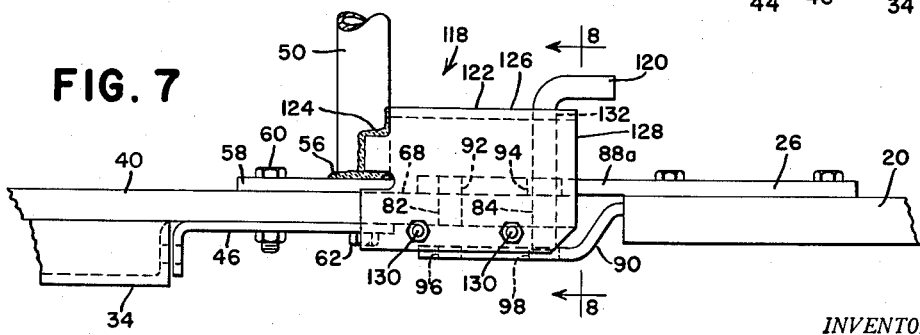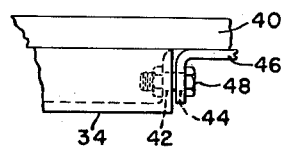

United States Patent Office 3,014,605
Patented Dec. 26, 1961

3,014,605
DISCHARGE CONTROL FOR HARVESTER
Robert A. Heising, Ottumwa, Iowa, assignor to Deere & Company, Moline, Ill., a corporation of Delaware
Filed Aug. 11, 1958, Ser. No. 754,281
3 Claims. (Cl. 214—42)

This invention relates to improvements in the draft connecting of components of an agricultural vehicular train, and more particularly the invention is concerned with improving the trailing relationship of a crop-receiving wagon to a harvester having a rearwardly directed crop delivery device.

The problem involved is one of maintaining crop-transfer communication between the delivery device and the trailer during changes in relative position of the harvester and trailer as on turns or when operating on the contour. Various proposals have been offered as solutions to this problem, and all of them involve in one form or another some means of mounting the crop delivery device for lateral swinging and some means for swinging the device in response to changes in position between the harvester and trailer. The simplest expedient is to connect the crop delivery device directly to the trailer by flexible means such as springs or the like, thereby assuring communication between the device and the wagon regardless of relative lateral positions of the components. However, connections of this type are cumbersome in that they must be removed each time the wagon is disconnected. This phase of the situation is accentuated when it is recognized that in the usual crop harvesting operation several trailers are used successively with the harvester, and each time a trailer is filled, it is disconnected and drawn by a separate vehicle to the place of storage or unloading.

According to the present invention, the means for controlling the relationship between the harvester, the crop delivery device and the trailer embodies novel draft structure incorporating means exclusively on the harvester drawbar and connected to and for controlling the position of the delivery device, thus divorcing the connection entirely from the trailer or the trailer draft tongue. It is a further feature of the invention that the harvester has a laterally swingable drawbar which is draft-connectible to the forwardly swingable tongue on the trailer, in which respect the invention provides means for rigidifying the connection between the drawbar and tongue so that no lateral movement between the two is permitted. In other words, the drawbar and tongue become in effect a one-piece member extending from the pivot of the drawbar to the harvester to the pivot of the tongue to the trailer. It has been found by experience that this type of connection affords better control of the crop delivery device, as distinguished from a situation in which relative lateral pivoting of the drawbar and tongue is permitted. Still further features of the invention reside in improved means for effecting the draft connection as well as the lateral rigidifying connection; improved draft structure combined with crop delivery device control means, particularly incorporating clevis means for receiving the forward end of the trailer tongue; retractable pin means for selectively connecting the tongue either pivotally or rigidly to the harvester drawbar; means for selectively rigidifying the harvester drawbar against lateral swinging when pivoting between the drawbar and the trailer tongue is desired; and such other features and objects as will appear from the ensuing description of the preferred embodiment of the invention as illustrated in the accompanying sheets of drawings, the several figures of which are described below.

FIG. 1 is a small-scale elevation of a typical tractor-harvester-trailer train.

FIG. 2 is an enlarged fragmentary elevation, partly in section, showing the details of the draft connection between the rear of the harvester and the front part of the trailer tongue.

FIG. 3 is a plan view, partly in section, as seen generally along the line 3—3 of FIG. 2.

FIG. 4 is a fragmentary plan view, with portions broken away, showing a typical trailer steerable wheel and tongue construction.

FIG. 5 is a fragmentary enlarged elevation as seen generally along the line 5—5 of FIG. 3.

FIG. 6 is a section on the line 6—6 of FIG. 5.

FIG. 7 is a view similar to FIG. 5 but showing a modified form of draft connection.

FIG. 8 is a section on the line 8—8 of FIG. 7.

FIG. 9 is a fragmentary view showing one form of releasable connection between the harvester drawbar and the harvester drawbar support.

The typical vehicular train shown in FIG. 1 comprises a tractor T, a harvester H and a trailing vehicle or trailer W. The harvester may be of any suitable type, having gathering means 10 which collect crops from the ground as the harvester is drawn forwardly by means of a draft connection 12 to the tractor. Crops gathered by the harvester are collected and may be treated or otherwise handled before discharge rearwardly via a crop delivery device, here in the form of a rearwardly directed spout 14. The spout is laterally swingable on the harvester, in this instance being mounted at its lower end by a swivel 16 on a vertical axis (FIG. 2).

The trailer is of the four-wheel type in which the front wheels 18 are steerable by a forwardly extending trailer tongue 20. The tongue may be pivoted on a vertical pivot at 22 to the trailer, and the steering linkage, indicated generally at 24, may be of the automotive type. The tongue extends forwardly to a front end 26 proximate to the rear of the harvester.

The harvester is carried on a pair of laterally spaced wheels 28, only one of which appears in the drawings, and these wheels are carried at opposite ends of a transverse axle 30. The harvester further includes a rearwardly extending frame part 32 and this part and the axle 30 rigidly support a rearwardly directed arcuate drawbar support 34. A rearwardly extending member 36, rigid on the axle 30, affords a vertical pivot 38, preferably substantially coincident or vertically coaxial with the swivel 16 of the spout or delivery device 14. The pivot 38 mounts the forward end of a generally fore-and-aft extending harvester drawbar 40. For most operating conditions, the drawbar 40 will extend rearwardly from the pivot 38. However, for other conditions, the arcuate support 34 is provided with a plurality of angularly spaced openings 42 in the upright flange thereof, and anyone of these openings may be registered with an opening 44 in an L-shaped member 46 secured to the underside of the rear part of the drawbar (FIGS. 2 and 3). In some instances, it may be desired to lock the drawbar 40 against angular swinging, and for this purpose releasable means such as a bolt 48 (FIG. 9) may be employed. The bolt may be passed through the aperture 44 in the drawbar member 46 in any one of the three angular positions provided according to the angular spacing of the holes 42 in the drawbar support 34. For present purposes, this releasable connection may be ignored and it may be assumed that it is normally not used when control of the lateral swingability of the spout 14 is desired.

Means is connected between the swingable harvester drawbar 40 and the swingable spout 14 so that the two are swingable laterally in unison. In the present case, this means takes the former of a rigid standard 50 having a bifurcated upper end 52 secured as by bolts 54 to a lower portion of the spout 14 (FIG. 2). The lower portion of the standard has welded thereto at 56 a forwardly extending apertured plate 58 which is secured to a rear part of the drawbar by a vertical bolt 60. A cap screw 62 is passed upwardly through the drawbar and coaxially into the lower end of the standard via an aperture in the rear part of the plate 58, as best shown at 64 in FIG. 5. The standard thus becomes a rigid part of the drawbar 40 and when the drawbar swings laterally about its pivot 38, the spout or delivery device 14 will be compelled to swing in the same manner about its pivot or swivel 16. Any misalinement or non-coaxiality between the pivots 38 and 16 is accommodated by inherent inflexibility in the relatively long standard 50.

The rear end of the drawbar, in conjunction with a portion of the standard 50, is equipped with draft means indicated in its entirety by the numeral 66, and one form of this is best shown in FIGS. 1 through 6. This means comprises the rear terminal end 68 of the drawbar 40 and bracket means on the standard 50 comprising a rearwardly extending plate 70 and a bracket member 72, welded to a lower portion of the standard 50 at 74 and 76 respectively. The plate 70 is spaced above or overlies the rear portion 68 of the drawbar 40 and has therein front and rear apertures 78 and 80, respectively. The drawbar is provided with vertical apertures 82 and 84 respectively in vertical alignment with the apertures 78 and 80 in the plate 70. The member 72 is welded to the plate 70 at 86 for increased rigidity. The plate 70 and rear portion 68 of the drawbar thus affords a clevis for receiving the forward end 26 of the tongue 20, which tongue is in the form of upper and lower plate like members 88 and 90, the upper of which has fore-and-aft spaced apertures 92 and 94 and the lower of which has respectively vertically alined apertures 96 and 98. When the drawbar and tongue are connected, the apertures 78, 92, 82 and 96 are in vertical register and afford a first set of apertures. Likewise, the rear apertures 80, 94, 84, and 98 are in register and afford a second set of vertically alined apertures.

The draft means for effecting the connection between the drawbar 40 and the tongue 20 further includes a pair of elements, one taking the form of a simple L-shaped pin 100 which is dropped downwardly through the rear set of apertures 80, 94, 84 and 98. The other element is a pin 102 which is slidably carried by the aperture 78 in the plate 70 and by an aperture 104 in the member 102, and this pin is normally spring loaded downwardly by a coiled compression spring 106 to pass through the tongue plate aperture 92 and drawbar aperture 82. The two pins, when connected, combine to laterally rigidify the drawbar and tongue. Hence, in that situation, the drawbar and tongue in effect constitute a single member extending fore-and-aft between the harvester and trailer and confined for lateral swinging about the drawbar pivot 38 and the tongue pivot 22 (FIG. 4). Therefore, turning of the components of the vehicular train as on corners will result in lateral swinging of the drawbar 40 accompanied of course by lateral swinging of the spout 14, whereby the spout retains its crop-transfer relationship to the wagon so that there is no failure of crop delivery on corners and other turns.

The spring 106 acts at its upper end against the underside of the top part of the member 72 and acts at its lower end against a diametrical pin 108 through the pin 102. The rear portion of the diametrical pin 108 extends through a slot 110 in the vertical part of the member 72 (FIG. 6), becoming thence a follower for traveling vertically in an upright portion 112 of the slot and also traveling laterally in an upper offset portion 114 of the slot. A handle 116 at the upper end of the pin 102 enables the user to retract the pin against the load on the spring 106, the follower portion of the pin 108 traveling upwardly in the slot until the upper portion of the slot is reached, after which the handle is turned about the axis of the pin 102 so that the pin 108 enters the offset portion 114 of the slot whereby the pin 102 is retained in its retracted position. In such case, the pin 100 becomes the sole connection between the drawbar 40 and tongue 20 and of course permits relative lateral swinging. An arrangement of this character may be desired for simple towing purposes. Likewise, in situations of this character it may be desired to employ the releasable means of FIG. 9 between the drawbar 40 and the drawbar support 34.

The modified form of the invention shown in FIGS. 7 and 8 embodies much of the basic structure of the form already described, and to that extent like reference characters will be employed. On this basis, the drawbar will be recognized at 40 as being carried by the drawbar support 34 and as including the standard 50 having at its lower end the plate 58 for rigid mounting to the drawbar by means of the bolt 60 and cap screw 62. The drawbar is equipped with the member 46 which is apertured as previously described for selective use of the means of FIG. 9. However, as distinguished from the structure of FIGS. 1 through 6, the modification of FIGS. 7 and 8 includes a different form of draft means, identified in its entirety by the numeral 118. In this case, the rear part 68 of the drawbar 40, although provided with the two apertures 82 and 84, employs only the rear aperture 84. Likewise, the plates 88 and 90 on the forward end of the draft tongue 20, although having the apertures 92, 94, 96 and 98, employ only the vertically alined rear apertures 94 and 98, which receive a pin 120 when the draft connection is effected. In lieu of the pair of pins for rigidifying the drawbar 40 and tongue 20 against lateral relative movement, the hitch means 118 utilizes a box-like structure 122 rigidly secured to the lower portion of the standard 50 as by welding at 124. This structure is of inverted U-shape as seen from the rear (FIG. 8) and includes a top portion 126 and laterally spaced apart depending walls 128 which are cross connected below the rear end 68 of the drawbar by a pair of transverse bolts 130. The structure 122 thus affords a rearwardly opening socket for receiving the forward end of the draft tongue, in which case the plate 88 is narrowed as shown at 88a in FIG. 8 for receipt by this socket. The upper portion 126 of the structure 122 has a vertical aperture 132 therein in register therewith the drawbar aperture 84 so that the aperture 132 also receives the pin 120. Because of the fore-and-aft length of the walls 128 of the structure 122, lateral rigidity between the drawbar 40 and tongue 20 is achieved, and the two, as before, comprise essentially a single member extending from the harvester pivot 38 to the trailer pivot 22 and essentially the results previously described are achieved.

As will be seen, both forms of the invention are simple constructed and easy and convenient to use. Features and advantages not categorically enumerated herein will readily occur to those versed in the art as will modifications and alterations in the preferred embodiments disclosed, all of which may be achieved without departure from the spirit and scope of the invention.

What is claimed is:

1. For use with a harvester having a rear-mounted laterally swingable crop delivery device, and a trailer behind the harvester to receive crops from said device and including steerable front wheels and a draft tongue connected to the trailer on a vertical pivot and connected to and for steering said wheels and extending forwardly to the harvester and having a pair of vertical apertures therein spaced apart fore-and-aft thereof, the improvement comprising: a drawbar connected to the rear of the harvester on a vertical pivot for lateral swinging and having therein a pair of vertical apertures respectively in register with the tongue apertures to afford first and second sets of registered apertures; means connected between the crop delivery device and drawbar exclusively of the tongue for effecting lateral swinging of said device and drawbar in unison; draft means connecting the drawbar and tongue and including said registered sets of apertures and first and second connection elements, said first element being releasably received by the first set of registered apertures to provide a vertically pivotal draft connection between said tongue and drawbar and said second element being received by the second set of registered apertures to rigidify the tongue and drawbar agianst relative lateral movement, said second element being selectively retractible from at least one of the apertures of the second set while the first element remains in place as a vertical pivot about which the tongue and drawbar are relatively laterally swingable; means for holding the second element in retracted condition.

2. The invention defined in claim 1, including: a bracket on the drawbar having a hole alined with the second set of apertures and receiving the second element therein for relative retraction from and entry into said second set of apertures; biasing means between the bracket and second element for holding said second element against retraction; and said bracket carrying the aforesaid means for holding said second element in retracted condition.

3. The invention defined in claim 1, including: releasable means cooperative between the drawbar and harvester for selectively fixing the drawbar against lateral swinging relative to the harvester about the harvester-to-drawbar pivot.

References Cited in the file of this patent

UNITED STATES PATENTS

| 649,444 | Good | May 15, 1900 |
| 1,306,462 | Bergerud | June 10, 1919 |
| 1,568,490 | Winsor | Jan. 5, 1926 |
| 2,665,144 | Birdwell | Jan. 5, 1954 |
| 2,905,343 | Heising | Sept. 22, 1959 |

FOREIGN PATENTS

| 521,909 | Canada | Feb. 21, 1956 |